3,645,960
POWDERED COATING COMPOSITIONS AND THE
METHOD FOR THEIR APPLICATION
Laurence H. Haag, Reading, Pa., assignor to The
Polymer Corporation, Reading, Pa.
No Drawing. Continuation-in-part of application Ser. No.
705,126, Dec. 26, 1957, now Patent No. 3,338,863. This
application Aug. 7, 1967, Ser. No. 658,594
Int. Cl. C08f 51/04, 51/08
U.S. Cl. 260—37 SB                                    5 Claims

ABSTRACT OF THE DISCLOSURE

This application discloses a powdered coating composition characterized generally as being a dry blend of thermosetting film-forming resins suitable for forming a coating on an article by thermofusion with up to about 4% of a solid infusible material having an oil absorption value of at least 75 pounds per 100 pounds. Reference is made particularly to the use of synthetic silicates and carbon black for this purpose, as well as to the use of of phenolic resins and the silicone resins. There is also disclosed the use of finely divided silica and epoxy resins for this same purpose.

---

This is a continuation-in-part of my copending application Ser. No. 705,126 filed Dec. 26, 1957 now U.S. Pat. 3,338,863.

This invention relates to a free-flowing, powdered coating composition which is adapted for application by a fusion process and to the method for its preparation.

Protective coatings have heretofore been applied by processes in which the protective coating is fused. In one such process, the article to be coated is pre-heated and coated with a fusible coating material which is in the form of a finely-divided powder. In this process, the coating material fuses on the surface of the article to form a continuous, protective coating film. The pre-heated article may be dipped into the powdered coating composition, or the coating composition may be sifted on to the pre-heated article, blown onto the article by the use of a stream of air or other gas, or otherwise deposited thereon in a thin, uniform film. After the deposition of such a layer, the article is usually again heated to assure the complete fusion of the particles of the composition to produce a uniform continuous protective coating film.

Another fusion coating process has recently been developed for the coating of articles with a finely-divided solid, fusible coating composition, in which the article to be coated is pre-heated to a temperature above the sintering temperature of the coating material and then briefly immersed, and preferably moved to and fro, in a fluidized bed of the coating composition. The heat in the article causes the discrete particles of the coating material to fuse into a continuous film coating the surface of the article. This process is disclosed in British Pat. 759,214, published Oct. 17, 1956, as well as in U.S. Pat. No. 2,844,489 of July 22, 1958 to Gemmer.

In still another fusion process, the surface to be coated may or may not be pre-heated and the particles of the protective coating are fused as they are deposited on the surface by a hot gas stream. In this type of a fusion process, the individual particles of the protective coating are in the fused state before they reach the surface of the article being coated.

This invention is concerned with compositions adapted for application by a fusion process. The term "fusion process" as used in this specification and in the appended claims may be defined as a process in which a protective or insulating coating composition is applied to the surface to be coated in the form of finely-divided solid particles which are either melted as they approach the surface to be coated or are melted only after they come into contact with the pre-heated surface and are deposited thereon.

As in the case of conventional coating processes, the film-forming material of the coating composition to be applied by a fusion process must produce non-tacky, durable films which are adherent to the surface to which they are applied. However, the formulation of coating compositions for application by a fusion process introduces requirements unlike those heretofore encountered in the formulation of conventional coatings and which are new to the protective coating industry.

Coating compositions which are intended for application by a fusion process must be capable of producing a coating film which is continuous and of substantially uniform thickness. To fulfill this requirement, the coating composition must have a sufficiently high viscosity when molten and at the maximum temperature which it reaches during the coating operation, to be retained as a substantially uniform film even on vertical surfaces, edges, and sharp corners of articles being coated. This requirement has heretofore created difficulty in the application by a fusion process of a number of thermosetting resinous coating materials which are quite fluid when in their molten state, but which are otherwise valuable coating materials.

Thermoset coatings offer many advantageous features. To produce such a coating by a fusion process, it is necessary to apply the film-forming component while it is still in a sufficiently unpolymerized state to be fusible, or, in other words, while it is not polymerized beyond that point at which it is no longer fusible, and then to heat the coating after it is on the article to complete the polymerization or cure of the film-forming material. To effect the heat-cure, it is necessary to retain the coating at an elevated temperature for a substantial period of time. The film-forming components undergoing polymerization pass through a phase of relatively low viscosity, prior to polymerizing to that degree necessary to cause them to become infusible, and frequently cannot be retained on the vertical surfaces, corners, and edges of the article being coated. This low viscosity creates serious difficulties in the use of these otherwise valuable materials.

For the purposes of the present specification and claims, the term "fusible thermosetting film-forming coating material" shall be defined as all thermosetting resins which are polymerizable above their melting temperature and which pass through a low viscosity stage during polymerization.

It is frequently desirable to produce a very heavy coating by a fusion process. Difficulties are encountered in the production of such coatings which give good coverage of corners and edges of articles even when using coating materials which have adequate viscosity for the production of thin coatings of uniform thickness. Difficulties also arise in the coating of objects which have variable cross-sections by fusion processes in which the articles are pre-heated, due to the fact that the thick sections of the article carry more heat than the thinner sections and hence, heat the coating material to a higher temperature than the thin sections do. The result is that the hotter portions of the coating material on the thicker sections tend to sag on vertical surfaces and run off of sharp corners. These difficulties are particularly serious in the application of thermosetting coatings by a fusion process.

The coating composition in accordance with this invention is a free-flowing powder which comprises a mixture of discrete particles of a fusible thermosetting film-forming coating material which is capable of polymerization to an infusible state under the influence of heat and discrete particles dry-blended therewith of a solid material which is non-fusible at the temperatures at which the said fusible film-forming material becomes molten.

The non-fusible powdered material which is included in this composition is essentially one which has an oil absorption value of at least about 75 pounds, and preferably of at least 100 pounds, per 100 pounds of the said infusible solid and which is present in an amount, of not more than about 4% by weight of the film-forming resin, sufficient to increase the hot melt viscosity of the film-forming resin. Best results are obtained when the solid of high oil absorption value constitutes from about 0.1% to about 4% by weight, and preferably less than 2% by weight, of the said fusible, polymerizable, film-forming material. These relatively minor additions of the infusible, powdered solid have a marked and surprising effect in increasing the viscosity when in the molten state. The oil absorption value, as contemplated in the present invention is determined by Federal Test Standard 141, Method 4191.

It is, of course, well known to include pigments and fillers in conventional protective coating compositions. It is also well recognized that when pigments and fillers are included in a liquid protective coating composition they must be thoroughly wet-out by the film-forming vehicle of the composition. Thus, in the production of a pigmented protective coating, the liquid vehicle and the pigment are ground in a paint mill in which the suspension of the pigment in the vehicle is subjected to mechanical working. This grinding operation is necessary to secure a coating film which is uniform in appearance and durable in use.

The composition in accordance with this invention differs from these pigmented or filled compositions in that the infusible powdered material included in it is not wet-out with the film-forming vehicle, but simply admixed therewith. Surprisingly enough, when the infusible solid is actually wet-out with the film-forming material, it is ineffective in the relatively minor quantities employed in the present invention to increase the viscosity of the composition when in the molten state. Thus, when the resinous material and the infusible solid are melted together, allowed to solidify and then ground to a powder, the composition will sag on vertical surfaces, whereas the same composition when prepared by thoroughly mixing the ingredients by dry-blending does not sag.

In addition to the general use of pigmented compositions in the coating art discussed above there are a number of specific examples of coating compositions for application by a fusion coating technique which relate to combinations of a solid infusible material and a resin. In the Gemmer U.S. Pat. No. 2,844,489 referred to above, the Example 4 thereof illustrates the use of a powdered nylon admixed with ⅒th of 1% carbon black. This combination, however, fails to suggest the unexpected results achieved by combining the same quantity of carbon black with a thermosetting resin. In the case of thermoplastic resins such as nylon, the melt viscosity is normally sufficiently high, that the presence of small quantities of material such as carbon black has no noticeable effect upon those qualities of the finished coating affected by melt viscosity namely, sag and edge pull. Accordingly, improvements in these qualities in the finished coating are not obtained when carbon black is combined with nylon in accordance with Example 4 of the Gemmer patent, whether that carbon black is either milled with nylon or dry blended therein.

In Example 10 of the Gemmer patent, reference is made to the use of molybdenum disulfide as an additive in resinous compositions for use in a fusion coating method. Molybdenum disulfide, however, fails to yield any significant improvements in melt viscosity or in those qualities of the finished coating affected thereby, because it is not a material having a sufficiently high oil absorption value.

The resinous component of the free-flowing powdered composition of the present invention has an average particle size within the range of about 25 microns to about 600 microns and, preferably within the range of about 50 microns, to about 250 microns, and the infusible powdered component has an average particle size within the range of about 3 millimicrons to about 20 microns and preferably within the range of about 8 millimicrons to about 8 microns. The composition will usually have a fusion coating index temperature as defined below, within the range of about 200° F. to about 700° F., and preferably within the range of about 250° to 600° F. The combination of the physical properties of the individual components of this free-flowing powder is such that the composition retains its free-flowing physical form during a reasonable period of time, despite the fact that the composition may contain an individual component, which alone is incapable of retaining a free-flowing powdered form.

The melting point of a coating composition is not fully indicative of its performance when used in a fusion process to produce a protective coating. The research which has resulted in this invention, has demonstrated that it is possible to formulate two different compositions having identical melting points, one of which is well adapted for application by fusion process to produce a continuous film on vertical surfaces without sagging, while the other is unsatisfactory in performance and incapable of producing satisfactory protective coating films in commercial use. This research has convinced me that there are, in addition to the melting point, a number of interrelated physical characteristics which control the performance of given formulations. It is my belief that the other important physical characteristics are the sharpness of the melting-point of the composition, the viscosity of the film-forming component of the composition when in a fused state, the interfacial tension between the surface being coated and the melting composition, and the rate of change of these characteristics with changing temperatures above the melting point of the composition. Other factors are undoubtedly involved.

For the foregoing reasons, the "fusion coating index" has been developed as a measure of the performance of the composition in a fusion coating process. The fusion coating index is a temperature expressed in degrees Fahrenheit to which an aluminum rod, having a diameter of one-half inch and the length of two and one-half inches must be pre-heated at the time of initial contact with the powdered coating composition to obtain complete fusion of the composition in the continuous film coating the surface of the rod when applied under the following conditions: immersion for 5 seconds in a uniformly fluidized bed of the powdered coating composition, the composition and the fluidizing gas being at ambient temperature, the fluidization being such as to increase the depth of the previously unfluidized bed by no more than 30%, and with no post-heating after immersion.

To make the "fusion coating index" definite and reproducible, the determination of this measurement is made to depend upon application of the coating material by immersion in a fluidized bed. It will be understood, however, that the "fusion coating index" is also an accurate indication of the behavior of the coating composition of this invention when applied by other fusion methods described above.

The requirement that the non-fusible powdered material which is included in this composition have an oil-absorption value of at least about 75 pounds per 100 pounds of the said infusible solid and preferably of at least 100 pounds per 100 pounds of the said infusible solid is an essential feature of the invention. It will be recognized that these oil-absorption values are relatively high and are possessed by relatively few infusible, powdered materials. My research had demonstrated that a pigment or a filler which does not have an oil-absorption value of at least about 75 pounds per 100 pounds of the pigment or filler is ineffective in the production of my improved, non-sagging coating composition which gives uniform edge and corner coverage by a fusion process. Table I lists a series of powdered materials which are suitable for use in the compositions in accordance with this invention, together with their oil-absorption values, while Table II lists a series of infusible powdered materials which my research has demonstrated are of no value for the production of these improved, non-sagging coatings.

TABLE I

| Trade name | Chemical composition | Oil absorption (lbs. oil/100 lbs. pigment) |
|---|---|---|
| Carbolac 1 | Channel black | 160 |
| Carbolac 2 | do | 135 |
| Carbolac 46 | do | 125 |
| Super Carbovar | do | 110 |
| Monarch 71 | do | 110 |
| Vulcan R | Furnace black | 120 |
| Sterling 10 | do | 145 |
| Cab-O-Sil | Finely-divided silica | 150 |
| Syloid No. 244 | do | 240 |
| Syloid No. 308 | do | 170 |
| Syloid No. 162 | do | 145 |
| GS Hydrophobic Silica | do | (1) |
| Celite | Diatomaceous silica products | 120–205 |
| Micro-Cel | Hydrated synthetic calcium silicate powder | 275–500 |

1 Cannot be measured.

TABLE II

| Pigment | Particle size and shape | Oil absorption, lbs. |
|---|---|---|
| Calcium metasilicate (Wollastanite) | 6 to 23μ acicular | 20 to 30. |
| Aluminum silicate (Cary Clay No. 200) | .8μ thin flat plates | 35. |
| Calcium carbonate | 0.3 to 10μ round | 18 to 65. |
| Rutile | 30 to 40μ | 14 to 25. |

An inspection of these tables shows that each of the materials which are useful has an oil-absorption value which is above about 75 pounds per 100 pounds of the material. On the other hand, the materials which are ineffective for the production of my improved coatings have oil-absorption values below about 75 pounds per 100 pounds of the material. Although my research has thoroughly demonstrated that the oil-absorption value of the infusible solid is controlling as to its effectiveness in my composition, I have been unable to explain the reason for the phenomena.

An important feature of this invention resides in the fact that it makes possible the use of thermosetting film-forming materials which have heretofore been unsuitable for use in fusion coatings due to their low viscosity when in the molten state and, hence, their tendency to flow off of vertical surfaces and to give poor coverage on edges and sharp corners. Thus, this invention makes possible the use of partially cured resins which are quite fluid when melted and which must be maintained at an elevated temperature for a relatively long period of time after they are deposited on the surface for the purpose of completing their cure. Such resinous materials are, for example, a so-called "B" stage phenolic resin and a partially cured epoxy resin.

This invention also presents very definite advantages when using fusible, thermosetting film-forming materials in coating compositions applied by a fusion process. The compositions in accordance with this invention permit the use of the higher pre-heat temperatures which are necessary, for example, in a fluidized bed process to produce heavy films. The presence of the infusible powdered material having a high oil-absorption value prevents the film-forming material from runing off the vertical surfaces of an article which has been heated to an unusually high pre-heat temperature for the purpose of fusing a thick layer of the powdered coating composition on a surface.

These compositions also offer definite advantages when used for the coating of objects having highly variable cross-sections. As noted above, the thick sections of such objects retain their heat longer than the thin sections with the result that parts of the coating composition on the thick sections reach a higher temperature than those on the thin sections. With the compositions in accordance with this invention, the thick sections of articles of variable thickness retain their coating substantially as well and uniformly as the thinner sections.

The film-forming component of this composition may be, for example, discrete particles of a fusible epoxy resin. For the purposes of the present invention, the epoxy resins are those which are in the form of particulate solids, which are poly-functional and thus polymerizable at fusion temperatures, and which have a low viscosity prior to undergoing polymerization. This resin may be composed of polymers of epichlorohydrin (1-chloro-2,3-epoxy-propane) with bisphenol A (2,2-p-hydroxyphenyl-propane) which have melting points of up to about 375° F. and which have molecular weights within the range of about 350 to 15,000. Although epichlorohydrin is a most important organic epoxide employed in the formulation of the epoxy resins which are used, other epoxides such as, for example, 1,2,3,4-diepoxybutane, may be used in the production of the resins used as my film-forming component. Similarly, epoxy resins derived from phenols, other than bisphenol A, are suitable for use in this composition. Such resins include, for example, the reaction product of epichlorohydrin with resorcinol, with phenols derived from cashew nut oils, with hydroquinone, with 1,5 - dihydroxynaphthalene or with 2,2,5,5 - tetrakis-(4-hydroxyphenyl)hexane. Phenolic intermediates of the resole type, hydrazines and sulfonamides such as, for example, 2,4-toluene disulfonamide, may also be used for reaction with an organic epoxide or organic peracids to produce epoxy resins suitable for use in this composition. Aliphatic epoxy resins are also suitable for use in this invention. Such resins, are, for example, the reaction product of epichlorohydrin with glycerol, with ethylene glycol or with pentaerythritol.

The epoxy resin included as a film-former in the composition may be in the "B" stage and consist, for example, of approximately 50% liquid epoxy resin and 50% solid epoxy resin, together with a catalyst such as, for example, a modified meta phenylene diamine. I have found that such a "B" stage resin having a melting point of about 160° F. is entirely satisfactory in this composition.

I may use a fusible, thermosetting phenolic type resin as a film-forming component of this composition. It may be any fusible co-polymer of a phenol, resorcinol, a cresol, or a xylenol with an aldehyde or with furfural. Thus, it may be a co-polymer of a phenol or a substituted phenol with formaldehyde or a formaldehyde-yielding material, such as, paraformaldehyde-hexamethylenetetraamine. It may be of a type which is soluble in organic solvents or it may be of the insoluble type, and in any case, the solubility or insolubility of the resin in organic solvents is immaterial to its use in my improved coating composition.

The phenolic type resin which I use in this composition may be a polymer of a phenol and an aldehyde of the thermosetting type whch is still fusible, which has been produced by a reaction in the presence of an alakline catalyst, which has been stopped at an intermediate stage of the reaction. This resin may be of the type which is insoluble in oil or it may be of the oil-soluble type. The oil solubility is not an essential prerequisite to the use of a phenolic type resin in my composition, as it is in the case of varnish compositions. However, the oil-soluble type of phenolics have desirable properties in a coating film produced from my composition. Such a resin may be a polymer, for example, of formaldehyde with p - cresol, p-ethylphenol, p-tertiarybutylphenol, p-tertiaryamylphenol, p-tertiary octylphenol, p-phenylphenol, di-isobutylphenol, or a "bisphenol," such as, 4,4-iso-propylidene-diphenol or 2,2 - bis(p-hydroxyphenyl)propane. Again, it may be of the modified type, such as, for example, one which has been modified with copal or resin to cause it to be oil-soluble.

Commercially available thermosetting phenolic resins which I found suitable for use in the composition in accordance with this invention are, for example, a plasticized modified phenolic resin having a ball and ring melting point of 239–257° F. and an acid number of 10–20. Another suitable phenolic resin is one which is a 100% phenolic heat-hardening resin having a softening point of 180–210° F. and a specific gravity of 1.11.

The silicone resins (polysiloxane resins) formed, for example, by the polymerization of methylpolysiloxane, methyl-phenylpolysiloxane, phenylpolysiloxane and diphenysiloxane, or mixtures of these materials, having molecular weights within the range from about 100,000 to about 600,000 are suitable for use as a film-forming component of this composition.

In addition to the two essential ingredients of this composition, which as will be understood from the foregoing are infusible powdered solids having an oil absorption value of at least 75 pounds of oil per 100 pounds of the infusible powder and a fusible, thermosetting resinous material, I may include other ingredients in the composition. Thus, in the case of compositions utilizing as the film-forming ingredient a thermosetting monomeric material or a partially cured "B" stage thermosetting resin, I may include in the composition a catalyst for the curing of the resin. Additional components such as pigments, fillers and adhesion promoters may also be provided. In the case of certain resins, for example epoxy resin, useful modifications of their properties may be obtained by incorporating minor proportions of a thermoplastic resin. Also in the case of epoxy resins, it is normally desirable to add an adhesion promoter. Normally it will be desirable to blend the foregoing ingredients with the film-forming resin by a hot- blending technique before that resin is comminuted to a fluidizable powder.

To prepare the compositions in accordance with this invention, I reduce the fusible, heat-hardening, film-forming component to a powder having a particle size within the range of about 25 microns to about 600 microns. I then dry blend this powdered film-forming material with the non-fusible powdered solid having the high oil absorption value specified hereinbefore, to form a uniform admixture of the particles of the two components.

In the use of this composition for the production of a protective coating on an article, I may pre-heat the article to be coated to a temperature within the range of about 200° F. to about 1000° F. and preferably to a temperature within the range of about 300° F. to about 800° F. and while the article is at a temperature within these ranges, deposit a uniform layer of the coating composition on all surfaces of the hot article which I desire to coat. A uniform layer of the composition may be deposited on the hot surface of the pre-heated article by sifting or dusting the powdered coating composition on to the hot surfaces and immediately shaking or blowing off any excess of the coating composition before it has an opportunity to fuse and become adherent to the surface.

In an operation in which I desire to coat all surfaces of an article, I prefer to form a fluidized bed of the coating composition following the procedure described in the Gemmer Pat. No. 2,844,849, referred to hereinbefore, pre-heat the article to be coated to a temperature within the range of about 200° F. to about 1000° F. and while at a temperature within that range, immerse the pre-heat article in the fluidized bed and preferably move the article to and fro in the bed, over a period of time determined by the desired thickness of the coating. The period during which the article is immersed in the fluidized bed is substantially instantaneous for the production of extremely thin coatings, and will ordinarily be less than 50 seconds. After the desired period of immersion in the fluidized bed, the article is withdrawn therefrom and any excess powder adhering to the article removed therefrom by shaking or blowing it with a stream of compressed gas, such as, for example, air.

The upper limit of pre-heating temperature of the article may be substantially higher than the upper limit of the fusion coating index as defined above. This difference in these limits arises from the fact that the fusion coating index is a range of minimum temperatures at which the composition can be applied by immersion in a fluidized bed of the composition under specialized conditions as defined above. In the usual operation, however, those specialized conditions do not exist and, therefore, higher pre-heat temperatures are often desirable in order to obtain heavier coatings or in order to compensate for the low thermal capacity of the article to be coated.

I may also apply my coating composition to the surface of an article by blowing it on to the surface of the article by the use of a stream of compressed gas. In this alternative, I may pre-heat the article to a temperature within the range of about 300° F. to about 800° F. and utilize a compressed stream of gas having a temperature below the fusion temperature of the protective coating particles.

One of the major features of this invention resides in the fact that a much heavier single-layer coating can be produced when utilizing fusible, thermosetting, film-formers which have a relatively low viscosity when melted than has heretofore been possible. This is made possible by the fact that a heavy layer of the coating composition can be built up on the surface of the article being coated without running off sharp edges or vertical surfaces as it becomes melted. This heavy single-layer coating possesses a number of obvious advantages and superior characteristics including a homogeneous structure and lack of pin holes due, for example, to the evaporation of the solvent from a lacquer-type coating composition.

It is sometimes necessary, in order to obtain a good adhesion of the coating to the surface of the article, to clean and roughen the surfaces thereon, as, for example, by means of sand or metal grit-blasting or acid etching.

If the surfaces of the article to be coated are likely to be greasy or oily, they should be degreased by proper solvent treatment with a solvent, such as, for example, trichloroethylene.

The coating composition in accordance with this invention is suitable for the coating of any article which can be heated to a temperature above the melting point of the film-forming components of the composition without damage. It may be used, for example, for the coating of articles made from a wide variety of metals, from wood, glass and a variety of different ceramic materials.

The following examples illustrate various specific embodiments of the coating compositions in accordance with this invention and their applications to produce protective coating films. It will be understood that these examples are given solely for the purpose of fully illustrating and explaining the invention and are not to be construed as limitations on its scope.

EXAMPLE 1

A plasticized modified phenolic resin having a melting point (ball and ring) of 239–257° F. and an acid number of 10–20, was reduced to a powder having a maximum particle size of about 250 microns and thoroughly dry-blended with a 0.25%, by weight, of its own weight of Syloid No. 244. This composition was found to give a satisfactory coating on a metal article which was heated to a temperature of 375° F., when applied by the use of the fluidized bed, and the article retained at that temperature for a period of 5 minutes after it was withdrawn from the fluidized bed.

Results comparable to those obtained in Example 1 may be readily obtained by replacing Syloid 244 with either Micro-Cel, a synthetic calcium silicate powder having an oil absorption value between 275 and 500 which is identified in Table I of this application, or one of the three Carbolacs, which are carbon blacks having an oil absorption value between 125 and 160, also identified in Table I.

EXAMPLE 2

A 100% phenolic heat-hardening resin having a softening point of 180–210° F. and a specific gravity of 1.11, was reduced to a powder having a maximum particle size within the range of about 350 microns and thoroughly dry-blended with 0.5% of its own weight of Syloid No. 244. This composition was found to give an entirely satisfactory non-sagging coating on metal pre-heated to 250° F. when applied from a fluidized bath and the coating retained at a temperature of 250° F. for a period of 5 minutes after removal from the bath.

EXAMPLE 3

A "B" stage epoxy resin composed of 50% liquid epoxy resin and 50% solid epoxy resin, containing as a catalyst a modified meta phenylene-diamine and having a melting point of 160° F. was pulverized to produce a powder having a maximum particle size of about 125 microns. This pulverized resin was thoroughly dry-blended with 0.25% of its own weight of Syloid No. 244. This composition was found to give entirely satisfactory, non-sagging coatings when applied from a fluidized bed to a metal article pre-heated to a temperature of 300° F. and the article retained at that temperature for a period of 15 minutes after being withdrawn from the fluidized bed.

EXAMPLE 4

An epoxy resin, prepared by the reaction of bisphenol A, with epichlorohydrin, which had a melting point within the range of about 64° C. to about 76° C., an epoxide equivalent of 450 to 525 and an equivalent weight of 130 was ground to a powder having a maximum particle size of 210 microns. Eighty parts by weight of this powdered epoxy resin was dry blended, with 20 parts, by weight, of a powdered curing agent, dicyandiamide, having a maximum particle size of 149 microns and 1.6 parts, by weight, of Cab-O-Sil. This composition gives a non-sagging coating on a cold rolled steel plate by a fluidized bed immersion process in which the steel plate, pre-heated to a temperature of about 350° F. is immersed in a fluidized bed for a period of 4 seconds and then placed in an oven at 350° F. for 15 minutes in order to cure the resulting coating.

EXAMPLE 5

An epoxy resin, having a melting point of about 127° C. to about 133° C., an epoxide equivalent of 1550 to 2000 and an equivalent weight of 190 was reduced to a powder having a maximum particle size of 210 microns. Eighty-three parts by weight of this powdered resin were dry-blended with 17 parts, by weight, of powdered dicyandiamide having a maximum particle size of 149 microns and 1.0 part, by weight, of Syloid 244. This coating composition produces a non-sagging, smooth, hard coating on an aluminum rod, when applied by a fluidized bed immersion process, in which the aluminum rod pre-heated to a temperature of 400° F. was immersed in a fluidized bed of the composition for a period of 4 to 6 seconds and then placed in a curing over at 350° F. for 20 minutes.

Results similar to those obtained in Examples 3, 4 and 5 may be obtained by substituting Micro-Cel or a Carbolac identified above, for either the Cab-O-Sil or Syloid 244 referred to in Examples 3 to 5.

Likewise the epoxy resin may be replaced by either a phenolic resin or a silicone resin, such as the exemplary resins described above. Similar results will be obtained.

I claim:

1. A coating composition of particulate solid material adapted to provide a durable, nontacky adherent film on a substrate in a fusion coating process, said composition comprising particles of a fusible thermosetting film-forming coating material and discrete particles of a solid powdered material that is infusible at temperatures at which said film-forming material fuses, said particles of solid powdered material being dry-blended with said particles of said fusible film-forming resin; said thermosetting film-forming material being a silicone resin which is capable of being fully polymerized above its fusion temperature to become infusible but which has a low viscosity at such fusion temperature and prior to polymerization to that degree necessary to cause it to become infusible rendering it difficult to retain a uniform coating of such film-forming materials on vertical surfaces, corners and edges of substrates; said solid infusible material being present in an amount, of not more than 4% by weight of said film-forming material, sufficient to increase the hot melt viscosity of said resin, thereby facilitating retention of a uniform coating of said resin on vertical surfaces, corners and edges of substrates at such fusion temperature, said solid infusible material being a silica which has an oil absorption value of at least about 75 lbs. per 100 lbs. of said infusible solid.

2. A composition according to claim 1 wherein said infusible solid is present in an amount of at least about 0.1% by weight of said fusible film-forming material.

3. A composition according to claim 2 wherein said film-forming coating material is in particulate form having a particle size within the range of about 25 microns to about 600 microns, said solid infusible material having a particle size within the range of about 3 millimicrons to about 20 microns.

4. A coating composition according to claim 2 wherein said film-forming coating material has a particle size within the range of about 50 microns to about 250 microns.

5. A coating composition according to claim 1 wherein the silicone resin has an average molecular weight within the range of about 100,000 to 600,000.

References Cited

UNITED STATES PATENTS

| | | | |
|---|---|---|---|
| 2,711,399 | 6/1955 | Smith | 260—37 SI |
| 2,844,489 | 7/1958 | Gemmer | 117—20 |
| 2,803,617 | 8/1957 | Corrin | 260—37 ST |
| 3,028,251 | 4/1962 | Nagel | 117—21 |
| 2,981,631 | 4/1961 | Nagel | 117—FLUID BED DIG |
| 2,933,461 | 4/1960 | Mullen | 260—38 |
| 2,477,009 | 7/1949 | Sandler | 106—198 |
| 2,718,471 | 9/1955 | Samler | 106—181 |
| 2,714,076 | 7/1955 | Seckel | 264—126 |

OTHER REFERENCES

Paint Manufacture, vol. 4, No. 1 (1934), pp. 6 and 7.

ALLAN LIEBERMAN, Primary Examiner

P. R. MICHL, Assistant Examiner

U.S. Cl. X.R.

117—21, DIG 6; 260—37 EP, 38